United States Patent [19]
Masuda et al.

[11] 3,877,540
[45] Apr. 15, 1975

[54] POWER STEERING SYSTEM HAVING A VARYING RESISTANCE RESPONSIVE TO RUNNING SPEED

[75] Inventors: Naosuke Masuda; Yoshiyuki Shimoura, both of Higarshimatsuyama; Hideo Konishi, Saitama, all of Japan

[73] Assignee: Jidosha Kiki Kabushiki Kaisha, Tokyo, Japan

[22] Filed: Oct. 19, 1973

[21] Appl. No.: 408,019

[30] Foreign Application Priority Data
Feb. 2, 1973   Japan................................ 48-13467

[52] U.S. Cl.............................. 180/79.2 R; 91/370
[51] Int. Cl............................................... B62d 5/08
[58] Field of Search ........ 180/79, 2 R; 91/370, 371, 91/372, 373

[56] References Cited
UNITED STATES PATENTS

| | | | |
|---|---|---|---|
| 2,819,092 | 1/1958 | Proctor et al. .................. | 180/79.2 R |
| 3,094,010 | 6/1963 | Folkerts............................ | 91/370 X |
| 3,183,992 | 5/1965 | Brueder ......................... | 180/79.2 R |
| 3,465,842 | 9/1969 | Hruska............................. | 180/79.2 R |
| 3,565,205 | 2/1971 | Planas............................. | 180/79.2 R |

Primary Examiner—David Schonberg
Assistant Examiner—John A. Pekar
Attorney, Agent, or Firm—Sughrue, Rothwell, Mion, Zinn & Macpeak

[57] ABSTRACT

Herein disclosed in a power steering system for use in an automotive power steering apparatus which includes a hydraulic motor for imparting a turning motion to a wheel axle of the vehicle, and a rotary control valve having input and output members connected respectively to a steering wheel of the vehicle and to the hydraulic motor and responsive to an angular displacement between the input and output members for regulating a working fluid under pressure to control the operation of the hydraulic motor. The present power steering system comprises means such as a governor pressure source for producing a second working fluid under pressure having its level varied in accordance with a running speed of the vehicle, and a reaction mechanism disposed at a portion of the output member of the rotary control valve and receptive of the second working fluid for resisting the angular displacement in accordance with the pressure level of the same, so that a resistance responsive to a running speed of the vehicle is imparted to the hydraulic motor and accordingly to the steering wheel.

4 Claims, 3 Drawing Figures

POWER STEERING SYSTEM HAVING A VARYING RESISTANCE RESPONSIVE TO RUNNING SPEED

BACKGROUND OF THE INVENTION

1. Field of the invention

The present invention relates to a steering apparatus for an automotive vehicle, and, more particularly, to a power steering system for use in the steering apparatus for providing such a proper steering force as accords to a running speed of the automotive vehicle.

2. Description of the Prior Art

Generally speaking, a conventional power steering apparatus includes a control valve actuated by a steering wheel for controlling distribution of a working fluid under pressure to a hydraulic motor, and a reaction mechanism for transmitting such a reaction, as is proportional to the output power of the power steering apparatus, to the steering wheel so as to let the driver sense the resistance to his steering action. More specifically, the ratio of this reaction to the output power is maintained at a constant value irrespective of the variation of the vehicle speed, and as such the reaction mechanism can merely transmit the output-power-responsive reaction to the steering wheel. It is, however, well known in the art that the resistance to be sensed by the driver in his steering action has a large value while the automotive vehicle is in a stop condition or in running at a low speed whereas the resistance has its value decreased as the running speed of the vehicle becomes higher. If, therefore, the particular ratio is set such that the steering output power is the most proper when the vehicle is halted or is running at a low speed, then the steering output power obtainable during a high speed running of the vehicle becomes too small to keep the straight running of the vehicle. The steering output power thus excessively depressed will also result in an over-steering of the steering wheel, which in turn results in uncomfortableness or uneasiness of the driver.

SUMMARY OF THE INVENTION

It is, therefore, an object of the present invention to provide a power steering system for use in an automotive power steering apparatus which is free from the above drawbacks.

Another object of the present invention is to provide a power steering system of the above type, in which a steering output power is in proper accordance with the running speed of the automotive vehicle.

According to a primary aspect of the present invention, a power steering system for use in a power steering apparatus of an automotive vehicle including a hydraulic motor for imparting a turning motion to a wheel axle of the vehicle, and a rotary control valve having input and output members connected respectively to a steering wheel of the vehicle and to the hydraulic motor and responsive to an angular displacement between the input and output members for regulating a first working fluid under pressure to control the operation of the hydraulic motor is disclosed, which comprises means for producing a second working fluid under pressure having its level varied in accordance with a running speed of the vehicle, and a reaction mechanism disposed at a portion of the output member of the rotary control valve and receptive of the second working fluid for reducing the angular displacement in accordance with the pressure level of the second working fluid, so that a resistance according to the running speed of the vehicle is imparted to the hydraulic motor and to the steering wheel. As a result, the driver of the vehicle can enjoy a light steering operation during a low speed range of the vehicle and a stable steering operation during a high speed range. Since, moreover, the present power steering system has its reaction mechanism disposed at a portion of the output member of the rotary control valve, the resistance to the driver's steering action, which is produced by the reaction mechanism, is not added as a portion of the steering output power to an output shaft of the present power steering system. As a result, the resistance will not be wasted as a pure resistance loss, so that performance of the steering system as a whole will be enhanced considerably.

According to a secondary aspect of the present invention, the reaction mechanism of the present power steering system includes at least a pair of plungers slidably inserted in the output member in the opposite rotational directions with respect to the input member for retention in contact with the output member by the biasing action of the second working fluid, when the rotary control valve is at its neutral position, so that the input member is turned through the steering wheel against the retained plungers. With these construction arrangements, the reaction mechanism can be easily installed without calling for a large space between the output member of the rotary control valve and the input member movable relative to the output member. Since, moreover, the plungers are arranged axially symmetrical and can have a plurality of pairs which are arranged tangentially of the rotational direction of the input member, their arrangements are so highly balanced to quickly follow pressure variations in the working fluid introduced thereinto.

BRIEF DESCRIPTION OF THE DRAWINGS

Other objects and advantages of the present invention will be apparent from the following description made in conjunction with the accompanying drawings, in which.

DESCRIPTION OF THE PREFERRED EMBODIMENTS

Figure 1:
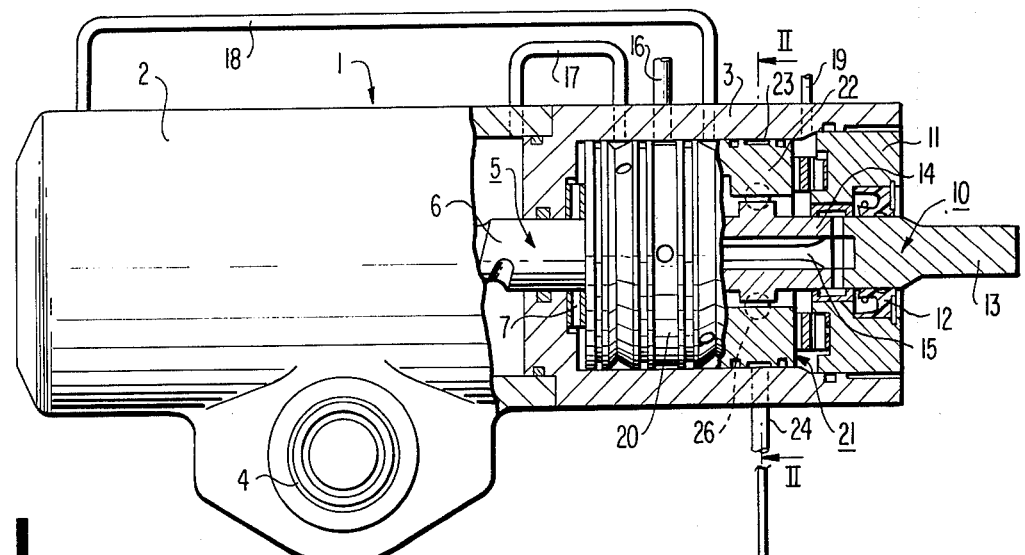
FIG. 1 is a partially longitudinally sectional view showing a power steering system of the present invention.

Referring now to FIG. 1, indicated at reference numeral 1 is an outer housing of a power steering system according to the present invention, which includes an actuating portion casing 2 accommodating therein a hydraulic motor (not shown) and a control valve casing 3 merging into a rear opening of the casing 2. Although not shown, in the actuating portion casing 2 are also accommodated a cylinder and a double acting piston fitted in the cylinder. This piston is formed at its lower end with a rack, with which a pinion gear of an output shaft 4 is in meshing engagement. This output shaft 4 is connected to a wheel axle of an automotive vehicle through the pitman arm, drag link and knuckle arm (not shown), as is well known in the relevant art.

Designated at reference numeral 5 is, on the other hand, an output member of the present power steering system, which includes a screw shaft 6 threaded through a multiplicity of balls into a helical groove formed in the center portion of the piston, and a valve main body 20 connected to the rear end of the screw shaft 6 and rotatably but hermetically fitted in the control valve casing 3. This screw shaft 6 is rotatably born in a through bore of the control valve casing 3 through a thrust bearing 7. Designated at reference numeral 10 is, moreover, an input member of the present power steering system, which includes a steering shaft 13 rotatably born in a rear cover plate 11 of the casing 3 through a seal member 12, and a hollow shaft 14 extending from the steering shaft 13 into a valve chamber (not shown) of the valve main body 20. This hollow shaft 14 has flexible shaft 15 inserted therein and connecting at its ends, the hollow shaft 14 with the screw shaft 6 for relative rotation to each other within a limited range. The steering shaft 13 is operationally turned at its outer end by a steering wheel (not shown) of the automotive vehicle.

Reference numeral 16 indicates a supply pipe which opens into one of annular grooves (not numbered) formed in the outer periphery of the valve main body 20 and which has fluid communication with a source of working fluid under pressure or a pump (not shown). Reference numerals 17 and 18 indicate communication pipes which are similarly open into the remaining annular grooves in the outer periphery of the main body 20 and which have fluid communications with the front and rear operating chambers defined by the piston, and reference numeral 19 indicates an exhaust pipe which opens into a low pressure side passage formed between the rear end plate of the valve main body 20 and the cover plate 11 and which has fluid communication with the not-shown fluid reservoir for returning thereto the low pressure side fluid discharged from the valve chamber inside of the valve main body 20. This valve main body 20 acts as a well-known rotary control valve in cooperation with a valve member (not shown) formed at the hollow shaft 14 which is positioned inside of the valve chamber thereof. The control valve thus constructed will be responsive to a regular displacement between the input and output members 10 and 5 for regulating distribution of the working fluid among the pipes 16 to 19 so as to controllably actuate the hydraulic motor. This operation is carried out by providing fluid communication between the supply pipe 16 and either of the front and rear operating chambers by way of one of the communication pipes 17 and 18, and by providing another fluid communication between the exhaust pipe 19 and the other of the front and rear operating chambers by way of the other of the communication pipes 17 and 18.

Figure 2:
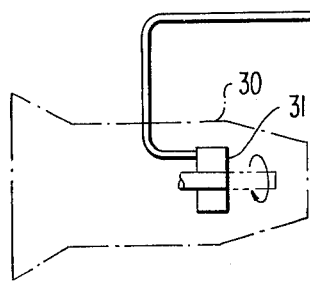
FIG. 2 is a cross-section taken along the line II — II of FIG. 1.

Designated at reference numeral 21, is, on the other hand, a reaction mechanism which is formed in the rear end portion of the valve main body 20. This reaction mechanism 21 includes a cylindrical body 22 constituting a portion of the valve main body 20, and a cooperation portion (not numbered) formed in the hollow shaft 14 which has fluid communication with the inside of the cylindrical body 22. The reaction mechanism 21 includes the following elements or members: Designated at reference numeral 23 is an annular groove which is formed in the outer periphery of the cylindrical body 22. Designated at reference numeral 24 is an introduction pipe which is open into the annular groove 23 for introducing therein a working fluid under pressure. This introduction pipe 24 has its other end communicated with a source of working fluid which has its pressure level varied with variation in a running speed of the automotive vehicle. This working fluid source may be a well-known governor mechanism 31 which is mounted on an output shaft of a hydraulic automatic power transmission 30. To the annular groove 23, therefore, is supplied a governor pressure which is responsive to the vehicle speed. More specifically, the annular groove 23 receives a low pressure fluid in a low speed condition of the vehicle but a high pressure fluid in a high speed condition. Turning now to FIG. 2, designated at reference numeral 26 are projections which are formed in one body on the hollow shaft 14 diametrically oppositely of each other. A space 32 extends between respective bores 27a, 27c and 27b, 27d, from the inner periphery of member 22. Designated at reference numerals 27a to 27d are plunger bores which are open at their outer ends into the annular groove 23 and which inwardly extend to the projections 26. Designated at reference numerals 28a to 28d are plungers which are slidably fitted respectively into the plunger bores 27a to 27d. Designated at reference numeral 29 are stepped portions which are formed on the cylindrical body 22 in a manner such that the sides are coplanar with the sides of respective projections 26 such that the two pairs of the plunger bores 27a, 27b and 27c, 27d are defined by their bases. Thus, the plungers 28a are always biased by the governor pressure, which is introduced into the annular groove 23, and are retained at the respective stepped portions 29. At this instant, the plungers 28a to 28d occupy such positions as to be in abutment engagement with the both sides of the projections 26 which are at a neutral position.

With these construction arrangements, when the steering wheel is turned in the clockwise direction, the flexible shaft 15 is twisted relative to the screw shaft 6 of the output member 5, so that both the valve main body 20 attached to the screw shaft 6 and the valve member (not shown) mounted on the hollow shaft 14 will be rotated relative to each other, thus acting as an ordinary rotary control valve. As a result, the distribution of the working fluid is, as has been described, accomplished such that either of the operating chambers of the hydrualic motor is communicated with the pump side supply pipe 16 by way of either of the communication pipes 17 and 18, and at the same time that the remaining operating chamber is communicated with the reservoir side exhaust pipe 19 by way of the other of the pipes 17 and 18. Thus, the hydraulic motor is driven to transmit a required steering output power to the output shaft 4. In this instance, however, only such reaction to a valve operation as is experienced against the biasing force of the working fluid in the ordinary rotary control valve, that is, only such reaction as accords to the steering output power is transmitted as a resistance to the steering action by the above steering operation to the steering wheel.

In this meanwhile, the projections 26 of the hollow shaft 14 are also turned in the clockwise direction, so that the plungers 28a and 28d abutting on the projections 26 will be moved outwardly against the action of the governor pressure from their retained positions in they are retained by the stepped portions 29. In other words, the governor pressure acting on these plungers 28a and 28d will be transmitted as a resistance to the steering action to the steering wheel by way of the projections 26, hollow shaft 14 and steering shaft 13. As has been described beforehand, moreover, this governor pressure is at all times applied as a vehicle-speed-responsive pressure to the plungers 28a to 28d. As a result, the vehicle-speed-responsive resistance is transmitted to the steering wheel in addition to the output-power-responsive reaction as above described. In this way, the present power steering system can enjoy a light handling in a low speed range and a heavy handling in a high speed range, thus providing a stable running of the automotive vehicle.

When, on the contrary, the steering wheel is turned in the counter-clockwise direction, it will be understandable that the projections 26 of the hollow shaft 14 will move the other pair of the plungers 28b and 28c, and accordingly that the same resistance to the steering action as described in the above is obtainable. It should be noted here that the magnitude of the particular resistivity can be selected properly in accordance with the output-power-responsive reaction.

Figure 3:
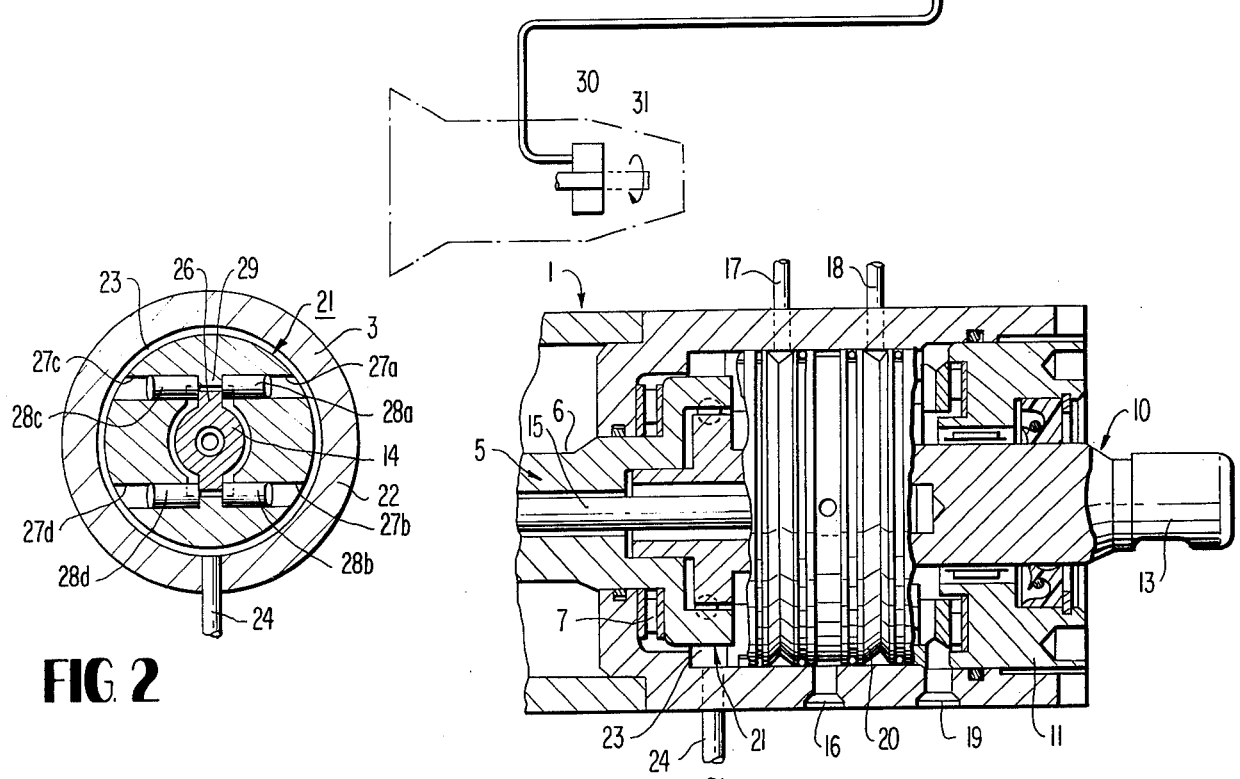
FIG. 3 is similar to FIG. 1 but shows another embodiment of the present invention.

Reference will now be made to FIG. 3, in which another embodiment with like numerals designating like elements, has its reaction mechanism 21 disposed at the rear end flange portion of the screw shaft 6. The construction it self of the reaction mechanism 21 is just the same as that of FIGS. 1 and 2. Such being the case, the repeated description thereof will be omitted here. In this embodiment, however, it shoud be appreciated that the valve main body 20 can be separated from the reaction mechanism 21 for machine working.

In an alternative, moreover, it should be understood that the governor pressure may be replaced by a working fluid which is discharged from a pump having its output pressure varied with the running speed of the vehicle.

As has been detailed in the above, since the power steering system according to the present invention is provided with a reaction mechanism disposed at a portion of an output member of a rotary control valve and imparting a resistance, which is responsive to a running speed of an automotive vehicle, to a hydraulic motor and accordingly to a steering wheel, the driver of the vehicle can enjoy a light steering operation during a low speed range and a stable steering operation during a high speed range. Since, moreover, the resistance to the driver's steering action, which is produced by the reaction mechanism, is not added as a portion of the steering output power to an output shaft of the present power steering system, the vehicle-speed-responsive resistance will not be wasted as a pure resistance loss, so that performance of the power steering system as a whole will be enhanced considerably.

Since, on the other hand, the reaction mechanism is provided with plungers disposed at the output member side and actuated by the input member for producing the vehicle-speed-responsive resistance, it can be easily installed without calling for a large space between the input and output members and be mounted as an integral portion in the conventional rotary control valve, so that it has such a compact construction as is so highly balanced as to quickly follow pressure variations in the working fluid introduced thereinto.

What is claimed is:

1. In a power steering system having a rotary control valve adapted for regulating a first working fluid upon angular displacement between concentric, radially inner, input and radially outer, output members, so as to control the operation of a hydraulic motor; the improvement comprising:

an annular groove formed in a portion of the outer peripheral surface of said output member for receiving a second working fluid of a pressure controlled in response to the speed of the vehicle on which the power steering apparatus is mounted, opposed pairs of plunger bores formed within the output member and extending inwardly from said annular groove towards each other, diametrically opposed radial recesses formed within the inner periphery of the output member and intersecting respective pairs of bores and forming therewith an abutment member defining the inner ends of respective bores, projections extending diametrically from the outer periphery of the input member and disposed within respective recesses within the inner periphery of said output member, and plungers slidably positioned within each of the plunger bores with said plungers abutting said abutment and respective sides of said projections when said valve is in its neutral position.

2. The power steering system as claimed in claim 1, wherein: said abutment means comprise steps which partially close off said plunger bore and wherein said projections and said steps are of corresponding width such that the bottom of respective bores as defined by the sides of said steps and the sides of said projections are coplanar with said valve in its neutral position.

3. The power steering system as claimed in claim 1, wherein: said projections are formed integrally with said input member and the width of said recesses within the inner periphery of the output member are wider than the width of said projections such that said input member can rotate relative to said output member under limited angular displacement.

4. The power steering system as claimed in claim 1, wherein: said rotary control comprises a cylindrical valve casing, said output member is rotatably and sealably mounted within said valve casing, said annular groove is formed within a portion of the outer periphery of said output member such that said groove is sealed relative to said valve casing, such that said second working fluid at a pressure corresponding to the speed of the vehicle which is continuously applied to the ends of said plunger by way of said plunger bores which open to said annular groove.

* * * * *